United States Patent [19]
Brewer

[11] Patent Number: 5,499,121
[45] Date of Patent: Mar. 12, 1996

[54] COLOR VARIANCE POLYMER MATRIX DISPLAY HAVING TWO SCATTERING STATES OR $N_P$ <OR> BOTH $N_E$ AND $N^O$

[75] Inventor: Donald R. Brewer, Vigo County, Ind.

[73] Assignee: Boit Inc., San Diego, Calif.

[21] Appl. No.: 33,494

[22] Filed: Mar. 18, 1993

[51] Int. Cl.⁶ .................................................. G02F 1/13
[52] U.S. Cl. ................... 359/51; 359/52; 359/98
[58] Field of Search ..................... 359/51, 52, 98

[56] References Cited

U.S. PATENT DOCUMENTS

| | | | |
|---|---|---|---|
| 4,616,903 | 10/1986 | Fergason | 359/52 |
| 4,671,618 | 6/1987 | Wu et al. | 359/52 |
| 4,685,771 | 8/1987 | West et al. | 359/52 |
| 4,688,900 | 8/1987 | Doane et al. | 359/52 |
| 4,699,470 | 10/1987 | McLaughlin et al. | 359/52 |
| 4,702,561 | 10/1987 | Huffman | 359/98 |
| 4,890,902 | 1/1990 | Doane et al. | 359/52 |
| 4,944,576 | 7/1990 | Lacker et al. | 359/52 |
| 4,950,052 | 8/1990 | Fergason et al. | 428/1 |
| 5,056,898 | 10/1991 | Ma et al. | 428/1 |
| 5,113,270 | 5/1992 | Fergason | 359/98 |
| 5,138,472 | 8/1992 | Jones et al. | 359/51 |
| 5,168,380 | 12/1992 | Fergason | 359/52 |
| 5,223,959 | 6/1993 | Wu et al. | 359/52 |
| 5,289,301 | 2/1994 | Brewer | 359/98 |

FOREIGN PATENT DOCUMENTS 2138838 10/1984 United Kingdom .

OTHER PUBLICATIONS

Schadt, "Field-induced color switching in liquid crystal display", J. Chem. Phys. vol. 71, No. 6, (15 Sep. 1979) pp. 2336–2344.

Drzaic et al., "High Brightness . . . Incorporating Pleochroic Dyes", SPIE, vol. 1080, (1989), pp. 41–47.

McCosh, "Automotive News Front", Popular Science (Aug. 1992), pp. 29–32.

Primary Examiner—William L. Sikes
Assistant Examiner—Ron Trice
Attorney, Agent, or Firm—Fitch, Even, Tabin, Flannery

[57] ABSTRACT

Liquid crystal polymer matrix displays are disclosed, one of which is capable of changing from a first color to a second color and shades of color therebetween, and the other of which is capable of changing from a first color to a true colorless state and to lower intensities of said first color. Droplets of liquid crystal material containing a dye mixture comprising a positive order parameter dye and a negative order parameter dye, or a positive order parameter dye and a zero order parameter dye, or a negative order parameter dye and a zero order parameter dye, are dispersed in the polymer matrix. The color changes are attained by varying the magnitude of an electric field across the polymer matrix. The optic axes of the liquid crystal material can be partially of fully aligned in one direction during the curing of the polymer matrix thereby enhancing possible color changes.

36 Claims, 9 Drawing Sheets

COLOR VARIANCE POLYMER MATRIX DISPLAY HAVING TWO SCATTERING STATES OR $N_P <$ OR$>$ BOTH $N_E$ AND $N_O$

BACKGROUND OF THE INVENTION (1) Field of the Invention

This invention relates generally to liquid crystal technology.

More specifically, this invention relates to liquid crystal apparatus in a polymer matrix capable of electronically controllable color variation.

(2) Description of the Prior Art

Liquid crystal displays which involve the incorporation of droplets of liquid crystals in a polymer matrix are known as polymer-dispersed liquid crystal (PDLC) displays or encapsulated liquid crystal (NCAP) displays.

This type of display (PDLC or NCAP) can be produced without the size restrictions which are encountered in conventional liquid crystal displays for reasons known to those skilled in the art.

A typical polymer-dispersed liquid crystal display (PDLC) is disclosed in U.S. Pat. No. 4,685,771 (1987) and in U.S. Pat. No. 4,688,900 (1987). The PDLC film comprises droplets of liquid crystal material dispersed in a flexible plastic film. The displays change from a scattering state to a transparent state by thermal, electrical, or magnetic means which change the orientation of the optic axes of the birefringent liquid crystal droplets in the polymer matrix. The index of refraction of the polymer matrix is matched to the ordinary index of refraction of the liquid crystals, so that, when the optic axes of the liquid crystals are oriented such that light is incident on the ordinary index of refraction of the liquid crystals, the display is transparent and, when light is incident on the extraordinary index of refraction of the liquid crystals, the incident light is scattered.

The encapsulated liquid crystal display (NCAP) is disclosed in U.S. Pat. No. 4,616,903 (1986). The NCAP display comprises specifically nematic liquid crystals encapsulated in a polymer medium. When interposed between two substrates with conductive layers thereon, the application of an electrical field thereacross changes the alignment of the director of the liquid crystals resulting in a variation from scattering to transparent state as with the PDLC display.

Where the PDLC and NCAP displays contain nematic liquid crystals, in the "off" state the indices of refraction of the liquid crystals are not aligned in any particular direction, and since some liquid crystal droplets have the extraordinary index of refraction parallel to the substrates, incident light will be scattered. When an electrical or magnetic field is applied transverse to the plane of the polymer film, the liquid crystal droplets' ordinary index of refraction is aligned parallel to the substrates, which results in a transmission of the incident light because the ordinary index of refraction of the liquid crystals matches the index of refraction of the polymer matrix.

A method has also been described whereby the extraordinary index of refraction of the liquid crystals is aligned during the curing process when making polymer matrix displays. In U.S. Pat. No. 4,688,900 (1987) a method is disclosed wherein an electrical field or a magnetic field of sufficient strength is applied across the plane of a PDLC film, straining the film in a particular direction after curing, to align the extraordinary index of refraction of the liquid crystals parallel to the substrates thus producing a film that polarizes one component of light. After the polymer matrix has cured, the alignment is permanent. Application of an electrical field or magnetic field normal to the plane of the PDLC film changes the direction of the extraordinary index of refraction normal to the incident light and reduces the polarization effects and scattering of light, thereby producing a controllable polarizer that varies from a scattering state to a transparent state. U.S. Pat. No. 4,944,576 (1990) describes the method of partially aligning one of the indices of refraction of the liquid crystal droplets while the polymer matrix is being cured.

In both the PDLC and NCAP displays, it is known from Drzaic et al, "High Brightness and Color Contrast Displays Constructed from Nematic Droplet Polymer Films Incorporating Pleochroic Dyes", SPIE, Vol. 1080, 1989 to add a positive order parameter dye to the liquid crystals, resulting in a display that exhibits a change from the color of the dye while in the scattering state, and then nearly no absorption in the "on" state when there is no scattering effect due to the rotation of the optic axes of the liquid crystal droplets. These displays produce only a change from a scattered color to a relatively transparent state, although there is still a problem with a small amount of color being apparent in the transparent state of the display, due to the imperfections related to the order parameter of dye always being less than one. This is illustrated in a commercial product application of a PDLC as a sun-roof in a Buick concept car (Popular Science, Vol. 241, No. 2 (1992), pp. 29–32), where the display is designed to change from color in the scattering state to clear in the transparent state, but in all states of transmission the sunroof still exhibits a tint of the color of the car. This can be a problem since it would be most desired to have absolutely no color appearance in the transmissive state. The solution to this problem heretofore has not been obvious to those skilled in the art.

In conventional liquid crystal displays, another variety of dye has been used in addition to the positive order parameter dye. In an article by Schadt, "Field-Induced Color Switching in Liquid Crystal Displays", J. Chem. Phys. Vol. 71(6), 15 Sep. 1979, pp. 2336–2344, a liquid crystal guest-host display comprising a liquid crystal host with positive dielectric anisotropy mixed with positive order parameter dyes and negative order parameter dyes, permits a change from one color to another color upon application of a voltage. This is achieved by the positive order parameter dyes changing from a colored to colorless state, while the negative order parameter dyes change from a colorless to colored state. This type of display is limited in size due to the force of gravity on the liquid crystals, and maintaining uniformity of cell thickness across a large display is very difficult.

SUMMARY OF THE INVENTION

One of the objects of this invention is to provide a device containing a liquid crystal and dye mixture in a polymer matrix that changes color upon application or removal of an electric field.

Another of the objects of this invention is to provide a device containing a liquid crystal mixture which may consist of positive order parameter and/or negative order parameter and/or zero order parameter dyes together with a liquid crystal host, all dispersed as droplets in a polymer matrix, which device is capable of changing from one color to another or to a true colorless state with the application or removal of an electric field.

A further object of this invention is to provide a method to control the optic axes of the liquid crystals during the curing of the polymer matrix thereby to determine the apparent color variations that the display will be able to produce.

A specific object of this invention is to provide large and durable liquid crystal displays capable of changing from one color to another, which can be secured by suitable means to a variety of articles, such as children's toys, automobile exteriors, and interior decorating applications, allowing electronic color control of the appearance of the article to which the display is secured.

Briefly, I have discovered that the foregoing objects can be obtained through use of a polymer matrix with liquid crystals dispersed as droplets therein and consisting of a liquid crystal host and one or more positive order parameter dyes and/or negative order parameter dyes and/or zero order parameter dyes. This combination permits the construction of a display that can be made larger than conventional liquid crystal displays, much more durable than conventional liquid crystal displays, and capable of switching from one color to another or to a true colorless state upon application or removal of an electric field across the display.

DESCRIPTION OF THE DRAWINGS

Referring now to the drawings, in which like numbers represent like parts in the several views.

DESCRIPTION OF THE PREFERRED EMBODIMENTS

Figure 1:
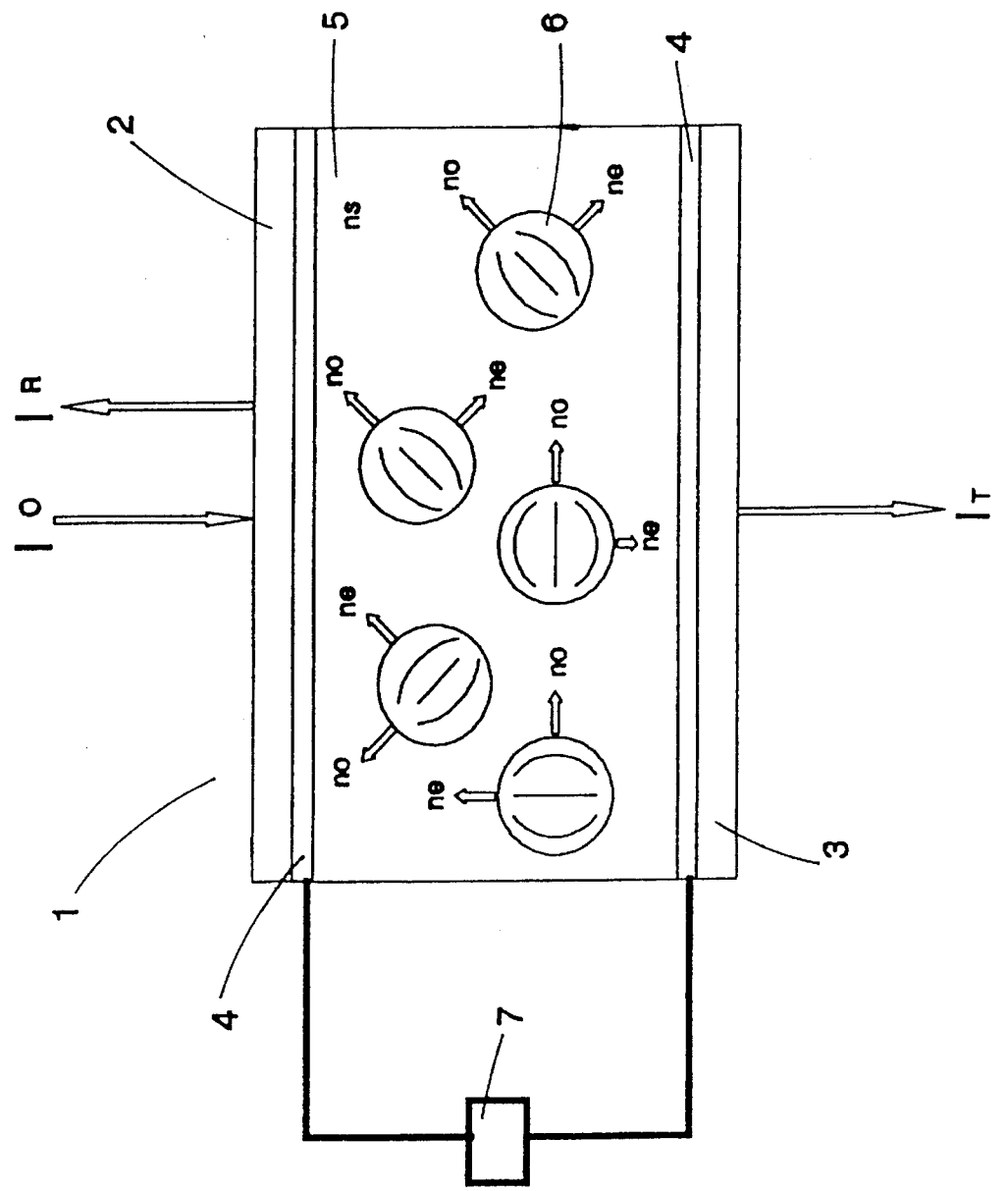
FIG. 1 represents diagrammatically a display construction comprising liquid crystal droplets dispersed in a polymer matrix between a superstrate and substrate with conductive electrodes deposited on their facing surfaces, which conductive electrodes are used to apply an electric field across the polymer matrix.

The following discussion of the technical background of liquid crystal displays will facilitate an understanding of the present invention.

When a positive order parameter dye and a negative order parameter dye are added to a nematic host with positive dielectric anisotropy, and then placed in a conventional polymer matrix (either PDLC or NCAP) display, the following color variation is realized. With no voltage (i.e., electric field) across the display, the color observed is the result of a combination of light absorption by the positive order parameter dye and the negative order parameter dye due to the varying direction of the optic axes of the nematic molecules with respect to the incident light. This is different from the conventional liquid crystal displays in which the optic axes of the nematic molecules are aligned parallel to the substrate surfaces and the color observed is produced only by the positive order parameter dye. Both the positive order parameter dye and the negative order parameter dye have a maximum and minimum light absorption dependent on their orientation. There will never be zero light absorption by a dye in a liquid crystal display due to order parameter imperfections. In the following discussions, the absorption of light by a dye will be mentioned only if it is in its orientation for maximum absorption. When a voltage (i.e., electric field) is applied normal to a film of liquid crystal material containing a positive order parameter dye and a negative order parameter dye, the optic axes of the nematic molecules will align normal to the substrates of the display. In this state, the color observed would be due to the absorption of light by negative order parameter dye only. Thus, the color of such a liquid crystal display would change from the color produced by a combination of light absorption by the positive order parameter dye and the negative order parameter dye to a color produced by the light absorption of only the negative order parameter dye.

An example of the foregoing is the combination of a blue positive order parameter dye and a red negative order parameter dye in a nematic host with positive dielectric anisotropy in a polymer matrix. With no voltage (i.e., electric field) applied across the display, the color observed would be purple. When an electric field is applied across the display with sufficient voltage to rotate the optic axes of the nematic liquid crystals, the color observed would be red.

The combination of a positive order parameter dye and a zero order parameter dye in a liquid crystal host with positive dielectric anisotropy, and with a random orientation of the optic axes of the nematic molecules, in the "off" state would produce a color resulting from the combined absorbance of both the positive order parameter dye and the zero order parameter dye. Application of an electric field across the display (i.e., the "on" state) would produce that color resulting only from the light absorption of the zero order parameter dye.

To produce a true color variation from the color produced due to the light absorption of the positive order parameter dye to the color produced by the light absorption of the negative order parameter dye would require the alignment of the liquid crystal directors during the curing stage. One example would involve alignment of the optic axes of the nematic liquid crystals parallel to the substrates of the display by the application of an electric or magnetic field across the plane of the polymer matrix film. After curing the polymer, an electric field could be applied normal to the film plane through the conductive electrodes present on the superstrate and substrate. This electric field will reorient the directors normal to the substrates resulting in a color produced by the light absorbance of the negative dye. Such a display could then change from the color produced by the positive order parameter dye to the color produced by the negative order parameter dye.

An example of the foregoing is a mixture of a blue positive order parameter dye and a red negative order parameter dye in a nematic host with positive dielectric anisotropy, all in a polymer matrix interposed between a superstrate and substrate with conductive electrodes deposited on their respective interior (i.e., facing) surfaces. A magnetic field of sufficient strength would align the extraordinary index of the nematic directors parallel to the substrates while the polymer matrix cured. After curing, the directors would remain aligned producing a blue color, and with the application of an electric field of sufficient strength the nematic directors would align parallel to the incident light producing a red color.

The combination of a positive order parameter dye and a zero order parameter dye in a liquid crystal host with positive dielectric anisotropy and with a uniform orientation of the optic axes of the nematic crystals in the "off" state will produce a color due to the light absorbance of both the positive order parameter dye and the zero order parameter dye because the zero order parameter dye has equal light absorption in any molecular orientation with respect to incident light. The application of an electric field across such display would then produce a color due to the light absorption of the zero order parameter dyes.

The invention disclosed herein differs significantly from conventional PDLC and NCAP displays, since it is not essential for successful operation that the index of refraction of the polymer matrix match either index of the liquid crystal host material, unlike the PDLC and NCAP displays. In fact, it will often be desired to have the index of refraction of the polymer matrix significantly higher or lower than that of the liquid crystal host, so that the color in all of the states would have the same type of diffuse color appearance. It will sometimes be desired to have the index of refraction of the polymer matrix lie between the ordinary index of refraction of the liquid crystal host (i.e., the index of refraction taken parallel to the short axes of the liquid crystal host) and the extraordinary index of refraction of the liquid crystal host (i.e., that index of refraction taken parallel to the long axes of the liquid crystal host). In addition, most applications of this invention will be used in the reflective mode, and a diffuse reflector will be used to insure that the color appearance is identical with every color variation produced.

Moreover, this invention is different from the PDLC and NCAP displays where small droplet size is a critical concern in obtaining the greatest difference between a scattered and transparent operation state. This is not an important concern in the present invention, since equal scattering in all states is actually a desired feature. Larger droplet sizes will also be desired in most applications to produce a lower voltage response for certain product applications.

FIG. 1 illustrates diagrammatically the basic structure of a liquid crystal polymer matrix display 1 comprising superstrate 2 and substrate 3 constituting the two faces of display 1 which are, in the preferred embodiment, flexible and may be fabricated from such plastics as polyesters, polycarbonates and the like.

Superstrate 2 is transparent, and may also have ultraviolet (UV) blockants thereon or therein to increase the life of the dyes present in the display 1 which otherwise might degrade with exposure to ultraviolet light. UV blockants are well known in the art.

Substrate 3 may be transparent or may be provided with a reflective surface consisting, for example, of a film of aluminum, silver, gold or the like deposited on or otherwise attached to the exterior surface thereof to achieve high reflectance, or may be provided by an appropriate means, either internally or on the exterior surface, with a color such as white.

Transparent electrodes 4, which may be films of indium-tin-oxide (ITO), tin oxide, or other suitable conductive material, are deposited on the interior (i.e., facing) surfaces of superstrate 2 and substrate 3.

Polymer matrix 5 is a solid light-transmissive matrix having dispersed therein droplets 6 of guest-host material comprising a liquid crystal host and guest dyes as hereinafter described. Polymer matrix may comprise polymerized resin, epoxy material, thermoplastic material, or a latex containment medium. Droplets 6 comprise a liquid crystal host which may be a cyanobiphenyl, which is nematic, with either positive or negative dielectric anisotropy, or a two frequency addressable liquid crystal that possesses positive and negative dielectric anisotropy at different frequencies of voltage applied across transparent electrodes 4. Droplets 6 also comprise a variety of dye combinations which may consist of positive order parameter dyes and negative order parameter dyes or zero order parameter dyes, or negative order parameter dyes and zero order parameter dyes.

In conventional polymer matrix displays, the index of refraction ($n_x$) of the polymer matrix is chosen to match that of the ordinary index of refraction ($n_o$) of the liquid crystals. Because of a random alignment of the optic axes of the liquid crystal droplets 6, this results in a scattering of the incident light $I_o$ making the display 1 appear opaque as observed by the transmitted light $I_T$ or the reflected light $I_R$. In the present invention, successful display operation does not require that the index of refraction of the polymer matrix match either of the indices of refraction of the liquid crystal droplets 6. The electronics 7 are connected to the transparent electrodes 4 and provide the voltage that aligns the extraordinary index of refraction ($n_e$) and the optic axes of the liquid crystal droplets 6 normal to the surfaces of the superstrate 2 and substrate 3, thereby changing the apparent color of the display. When the liquid crystal droplets 6 are dispersed in the polymer matrix 5 by conventional means well known to those skilled in the art, the directors of the liquid crystal host molecules and the several-dyes hereinbefore mentioned in the said liquid crystal droplets 6 are randomly aligned, as shown diagrammatically in FIG. 1.

Figure 2:
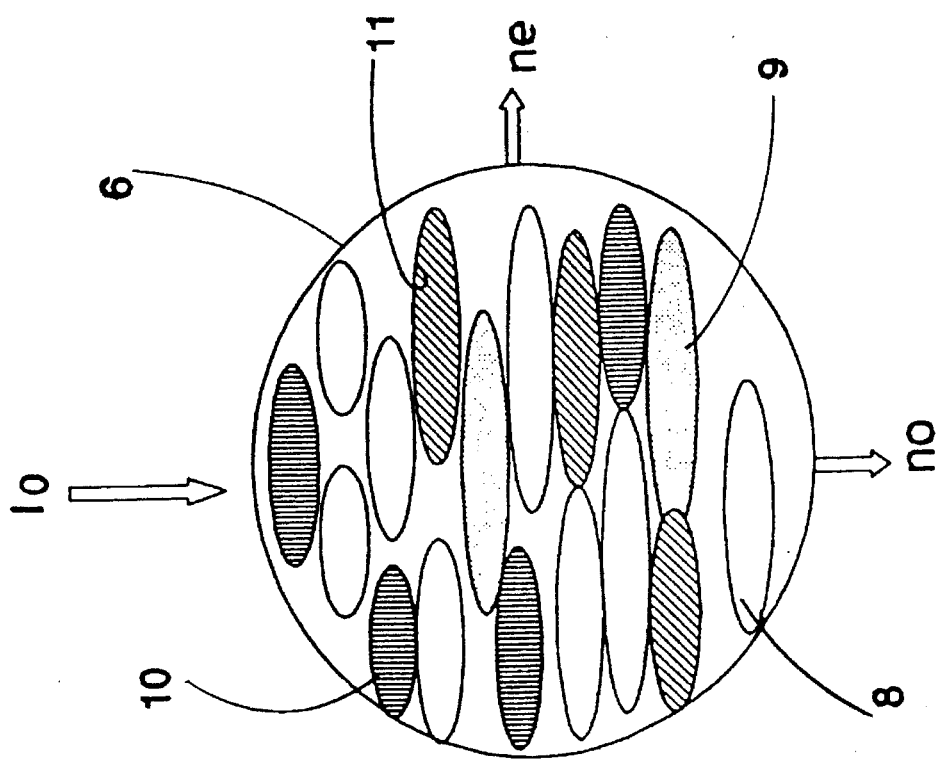
FIG. 2 represents diagrammatically a droplet of liquid crystal host material having therein positive order parameter dyes, negative order parameter dyes and zero order parameter dyes.

FIG. 2 represents a liquid crystal droplet 6 containing the liquid crystal host molecules 8, positive order parameter dyes 9, negative order parameter dyes 10, and zero order parameter dyes 11. With incident light $I_o$ on the display 1 and the liquid crystal droplets 6 consisting of, for example, a liquid crystal host 8 with positive dielectric anisotropy and positive order parameter dyes and negative order parameter dyes, or positive order parameter dyes and zero order parameter dyes, and in the absence of an electric field across the display 1, the transmitted light $I_T$ or reflected light $I_R$ would have an apparent color produced by the combined absorption of the dyes contained therein due to the random alignment of the optic axes of the liquid crystal droplets 6. An electric field applied across the display 1 (i.e., normal to the plane of the polymer matrix film 5) would produce a color due to the absorption of the negative order parameter dye or zero order parameter dye, depending upon which of the two above mentioned mixtures was used.

Figure 3:
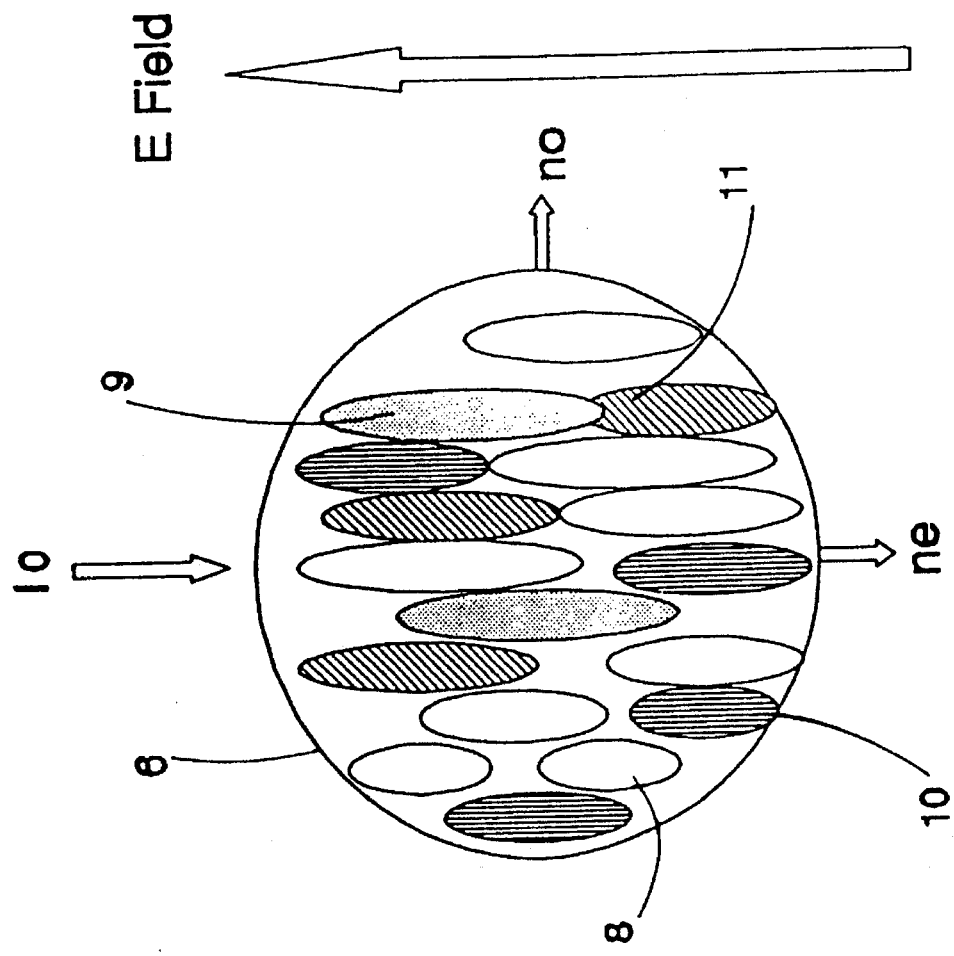
FIG. 3 represents diagrammatically the effect of the application of an electric field on the optic axis of the liquid crystal host material, which thereby changes the molecular orientation of the liquid crystal molecules and the dye molecules mixed therein.

FIG. 3 represents diagrammatically the alignment of the optic axis of the liquid crystal host 8 with positive dielectric anisotropy along with a dye mixture of positive order parameter dyes 9, negative order parameter dyes 10, and zero order parameter dyes 11 when an electric field is applied across the liquid crystal droplet 6. With incident light $I_o$ parallel to the said optic axis, the resulting color will be produced by the absorption of only the negative order parameter dyes or zero order parameter dyes, depending upon the dye mixture used.

Figure 4:
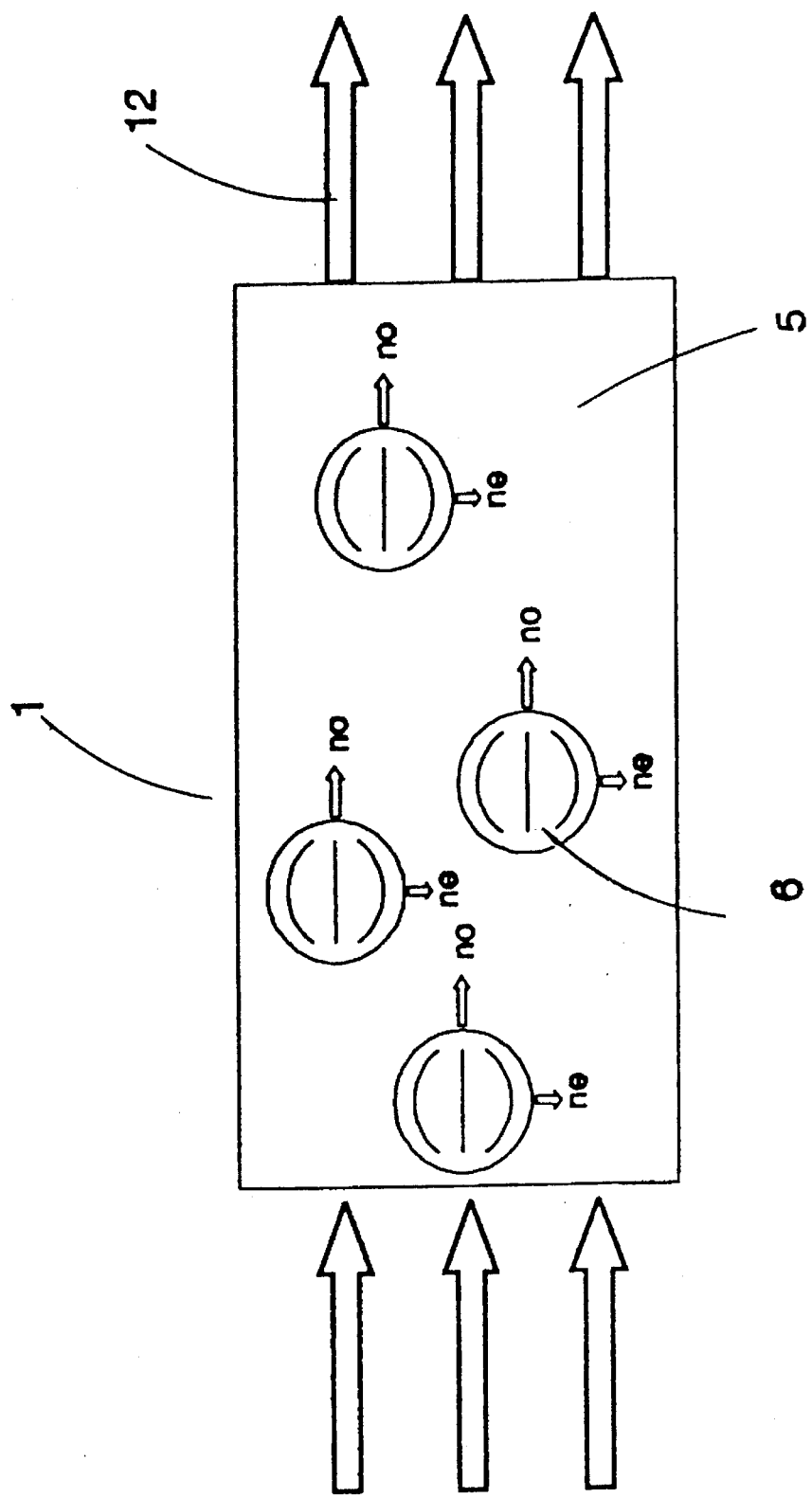
FIG. 4 represents diagrammatically a polymer matrix display that is cured while in the presence of an applied electric or magnetic field to align the optic axes of the liquid crystal host molecules parallel to the substrate surface.

FIG. 4 represents diagrammatically a polymer matrix display 1 that has a field 12, electric or magnetic, applied parallel to the plane of the film of polymer matrix 5 during the curing process. This aligns the optic axes of the liquid crystal droplets 6 containing, for this example, a liquid crystal host 8 with positive dielectric anisotropy. Other methods used to obtain full or partial alignment may also involve stretching of the film of polymer matrix 5 in a particular direction, or curing the display in a super-cooled environment, or by application of other methods known to those familiar with this art. After the film of polymer matrix 5 has been cured and the applied field 12 is removed, the optic axes of the liquid crystals 8 remain aligned normal to light incident on the display 1. If, for example, the liquid crystal droplet 6 contained a mixture of positive order parameter dyes 9 and negative order parameters 10, as shown in FIG. 2, and with the absence of a field 12, the color that would be observed as the result of incident light $I_o$ would be due to the absorption of only the positive order parameter dyes 9. When an electric field is applied across the display 1, the optic axis of the liquid crystal host 8 would align as in FIG. 3 resulting in a color produced by the absorption of only the negative dyes. It will be apparent to those familiar with this art that various color combinations can be obtained by selecting various mixtures of positive order parameter dyes 9 and/or negative order parameter dyes 10 and/or zero order parameter dyes and by selecting liquid crystal host materials 8 with various dielectric anisotropies.

EXAMPLE 1

This example is a polymer matrix display 1 capable of changing from one color to a true colorless state.

Display 1 consisted of a blue positive order parameter dye in a liquid crystal host that is commonly used in the industry. Display 1 had 3.4% by weight of the blue positive order parameter dye known as M-483 sold by Mitsui Toatsu Chemicals, Inc., mixed in the liquid crystal host E7, a common nematic liquid crystal host sold by E. Merck. A mixture consisting of 35% of the liquid crystal host and dye was combined with 52% of the polymer resin known as AU-1033, and 13% N75, a diisocyanate sold by Aldrich, which itself was mixed with 89% toluene.

Figure 5:
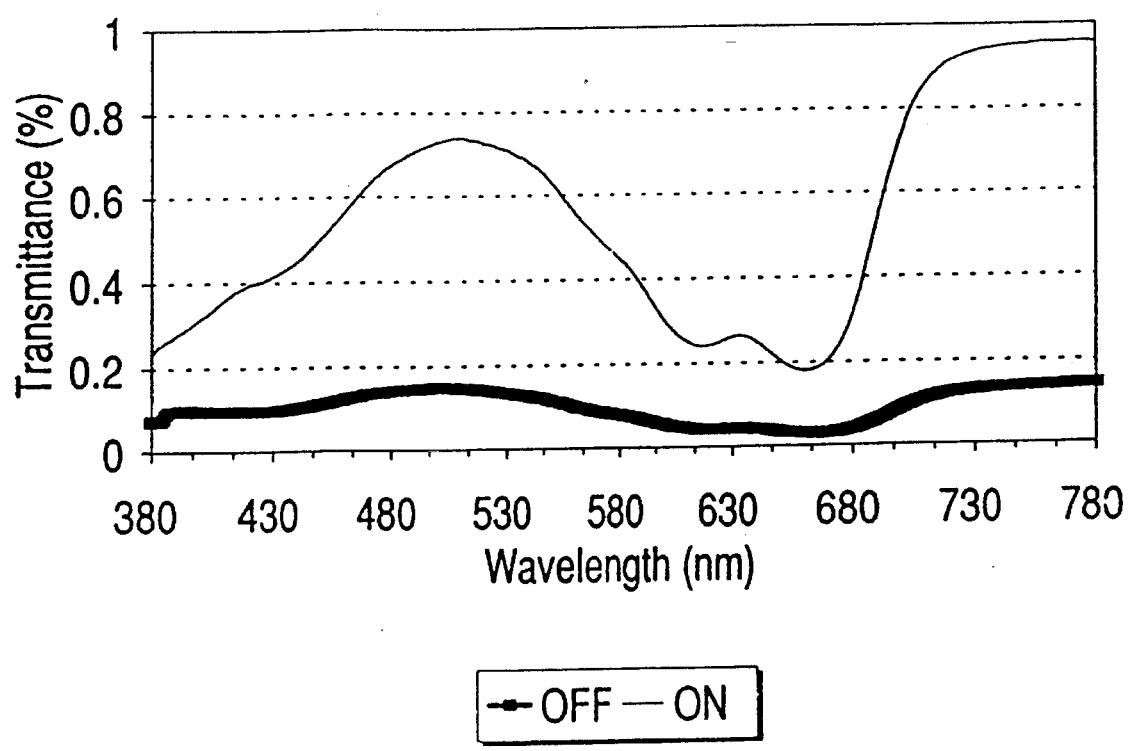
FIG. 5 is a graph showing that a conventional liquid crystal polymer matrix display incorporating a positive order parameter dye still retains color in the transparent "on" state.

The polymer mixture was applied to the ITO-coated side of a piece of glass and set aside to allow evaporation of the solvents. The second piece of ITO-coated glass was then placed on the polymer mixture and the display was heated at 125 degrees Celsius while under pressure for 5 minutes. The display 1 was then allowed to cure on a surface heated to 70 degrees Celsius for 6 hours. The transmittance spectra were then obtained. FIG. 5 represents the transmittance curve measured for this display 1 in the "on" and "off" states. Display 1 was measured only for transmission therethrough, while the scattering effects had been normalized by placing a similar display with no dye material in the reference arm of the spectrophotometer. It will be seen that display 1 in the "on" state still retains a slight absorption thereby producing a blue color exhibited by the existence of the dye's characteristic two peaks of maximum absorption at wavelengths 595 nm and 640 nm. This existence of color in a desired colorless state of operation is observed in PDLC products throughout the industry.

Figure 6:
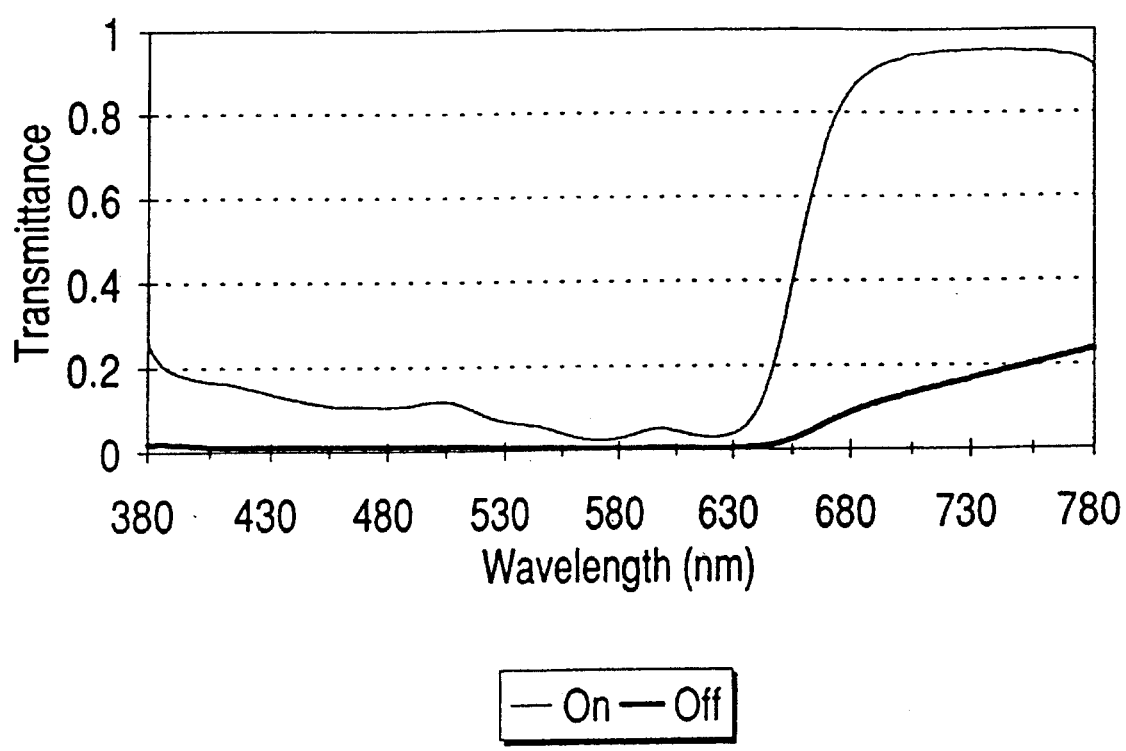
FIG. 6 is a graph showing that the novel liquid crystal polymer matrix display constructed as disclosed herein can exhibit a true colorless condition.

Another mixture was made using the same methods described above except that the dyes and their concentrations were different. The blue positive order parameter dye, known as M483, had a concentration of 3.4%, while two negative order parameter dyes were added to produce a uniform absorption in the "on" state thereby making a true colorless state. The dyes used consisted of 2.5% of a red negative order parameter dye known as 3,6-dialkyl-1,8-bis(aroylamino)-5-aroyloxy-4oxyanthraquinone, and 3.0% of a yellow negative order parameter dye known as 3,6-dialkyl-1,8-bis (aroylamino)-4,5-bis (aroyloxy) anthraquinone. FIG. 6 represents the graph of the transmittance spectrum of this display in the "off" and "on" states. The "off" state transmittance spectrum can be seen to have a blue color, while the "on" state is a near truly clear transmittance since the light absorption is uniform across the entire visible spectrum.

EXAMPLE 2

This example is a polymer matrix display 1 in which positive order parameter dyes and negative order parameter dyes were mixed to produce, ideally, a purple to a red color change. The dye mixture consisted of 1.76% of the blue positive order parameter dye M-483 and 4.60% of the red negative order parameter dye known as 3,6-dialkyl-1,8-bis (aroylamino)-5-aroyloxy-4-oxyanthraquinone. These dyes were placed in the nematic host E7 and mixed with the same polymer matrix mixture and cured with the same methods that are described in EXAMPLE 1.

Figure 7:
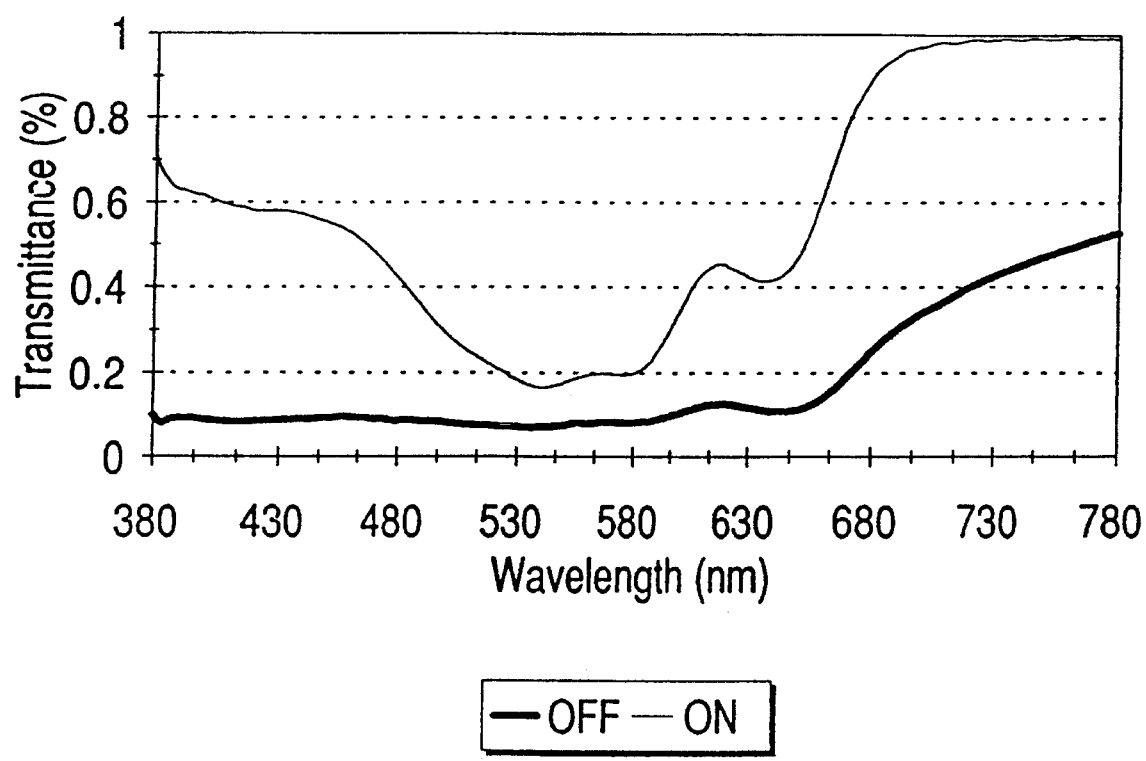
FIG. 7 is a graph showing measured transmittance of the novel liquid crystal polymer matrix display constructed as disclosed herein and resulting in a change of color.

FIG. 7 represents the change in absorption from the "off" to "on" states. It can be seen that the "off" state has a purple color with high absorbance across the entire visible spectrum, while the "on" state has a more reddish color exhibited by a larger absorption around the 540 nm range.

EXAMPLE 3

Figure 8:
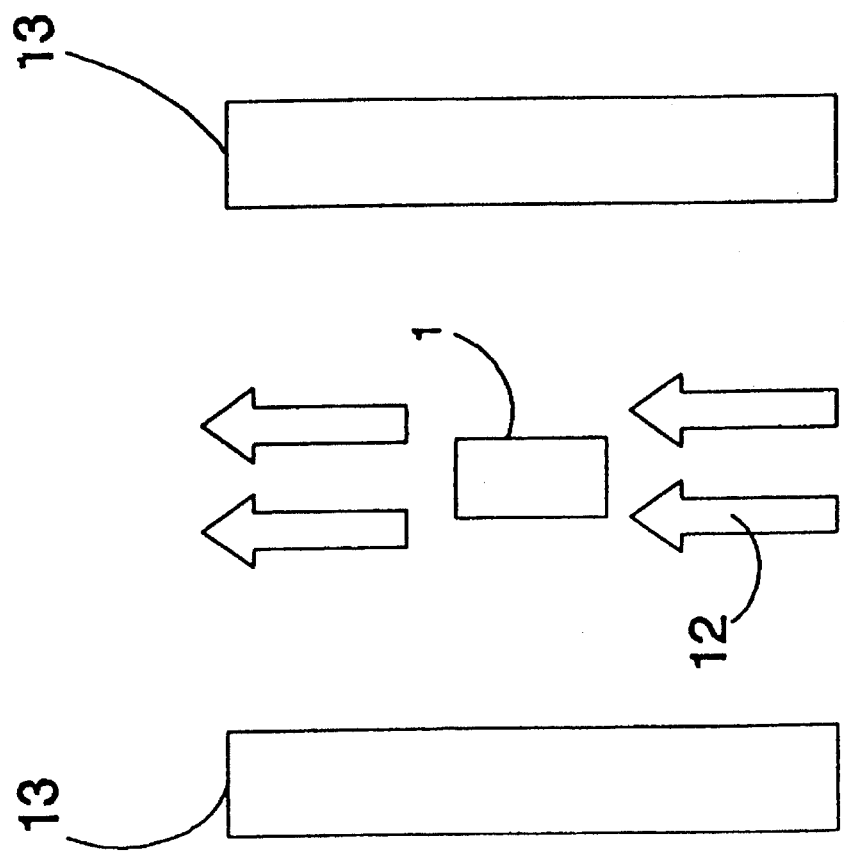
FIG. 8 represents diagrammatically an experimental setup used to align the directors of the liquid crystal host during curing with a magnetic field.

This example involves the same dye mixture described in EXAMPLE 2, except that the display was cured in a lateral magnetic field across the plane of the film. FIG. 8 represents the experimental setup used with the display 1 in the magnetic field.

Figure 9:
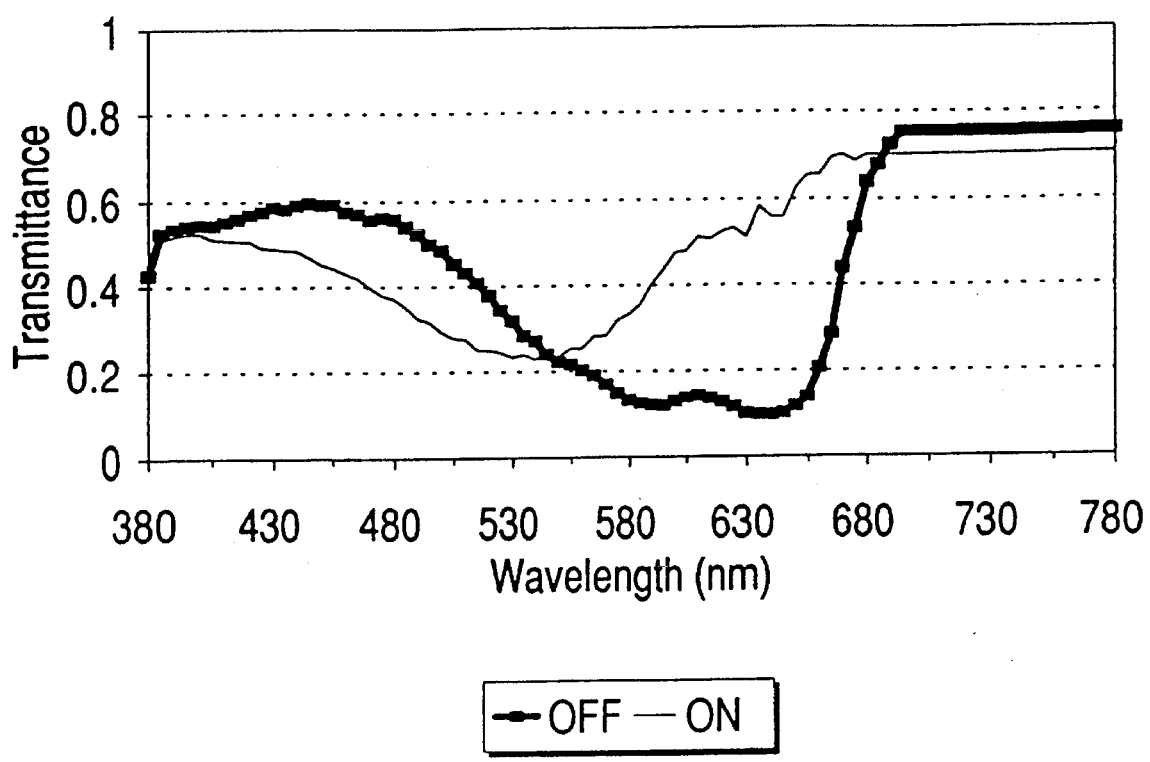
FIG. 9 represents diagrammatically measured transmittances for the novel liquid crystal polymer matrix display constructed as disclosed herein, with its directors aligned and which changes from the color produced by the positive order parameter dye to the color produced by the negative order parameter dye and shades of color therebetween.

FIG. 9 represents the absorption spectrum of this display in the "off" and "on" states. A comparison of FIG. 7 and FIG. 9 in the "off" states indicates that there is less red absorption due to the alignment of the extraordinary axis of the liquid crystal host material 8 parallel to the substrates.

EXAMPLE 4

This example involves the polymer matrix display 1 in which a positive order parameter dye and zero order parameter dye were mixed to produce a green to yellow color change. The dye mixture consisted of 2.02% of the blue positive order parameter dye M-483 and 1.89% of a near zero order parameter dye P616 Fluoroyellow (sold by Chemserve Corporation in Detroit, Mich.). These dyes were placed in the nematic host #7 and mixed with the same polymer matrix mixture and cured with the same methods that are described in EXAMPLE 1.

Figure 10:
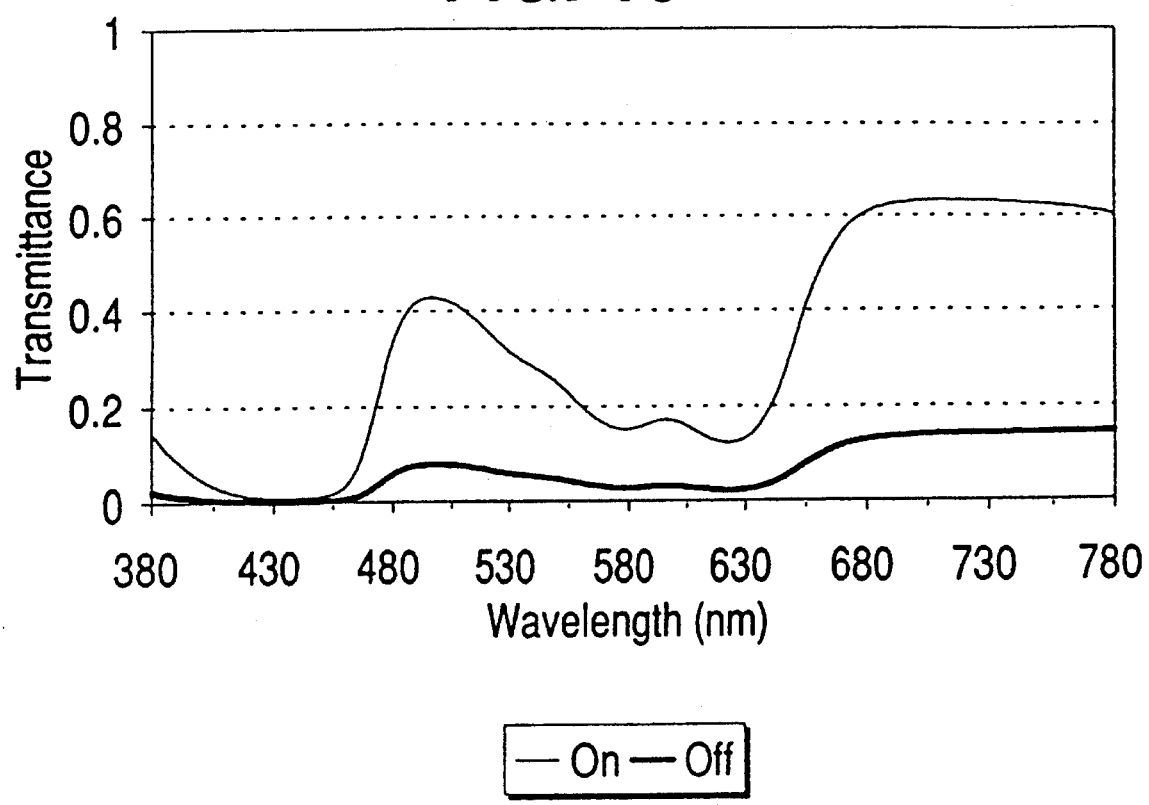
FIG. 10 is a graph showing measured transmittance of the novel liquid crystal polymer matrix display constructed as disclosed herein and resulting in a change of color with a combination of a positive order parameter dye and zero order parameter dye.

FIG. 10 represents the change in absorption from the "off" to "on" states. It can be seen that the "off" state exhibits a green color, while in the "on" state has a more yellowish color.

The foregoing specification is illustrative of the principles of the invention. Since modifications and changes which do not depart from the spirit of the invention may readily occur to those skilled in the art to which this invention pertains, this invention should not be considered as limited to the exact apparatus shown and described herein, and the appended claims should be construed as covering suitable modifications and equivalents.

I claim:

1. A color variance polymer dispersed liquid crystal display comprising:

a polymer matrix;

droplets of liquid crystal material dispersed in said polymer matrix, said liquid crystal material having optic axes uniformly aligned in one direction upon application of an electric field of sufficient magnitude to said polymer matrix;

a mixture of dyes incorporated in said liquid crystal droplets such that the polymer matrix exhibits color changes ranging between a first color and a second color in response to changes in the magnitude of the electric field to said polymer matrix;

wherein each index of refraction of said liquid crystal droplets is greater or less than the index of refraction of said polymer matrix;

whereby said display will produce said first color in the absence of an electric field to said polymer matrix and said second color when an electric field of sufficient magnitude is applied to said polymer matrix; and whereby said display will produce shades of color between said first and second colors upon application of an electric field having a magnitude above zero and less than said sufficient magnitude to said polymer matrix.

2. The color variance polymer liquid crystal display of claim 1 wherein said mixture of dyes comprises a positive order parameter dye and a negative order parameter dye.

3. The color variance polymer liquid crystal display of claim 1 wherein said mixture of dyes comprises a positive order parameter dye and a zero order parameter dye.

4. The color variance polymer liquid crystal display of claim 1 herein said mixture of dyes comprises a negative order parameter dye and a zero order parameter dye.

5. The color variance polymer liquid crystal display of claim 1 wherein said liquid crystal material is nematic.

6. The color variance polymer liquid crystal display of claim 1 wherein said liquid crystal material exhibits positive dielectric anisotropy.

7. The color variance polymer liquid crystal display of claim 1 wherein said liquid crystal material exhibits negative dielectric anisotropy.

8. The color variance polymer liquid crystal display of claim 1 wherein said liquid crystal material exhibits positive dielectric anisotropy or selectively negative dielectric anisotropy depending upon the frequency of a voltage applied across said polymer matrix.

9. The color variance polymer liquid crystal display of claim 1 wherein said polymer matrix is a resin, thermoplastic, epoxy or latex.

10. The color variance polymer liquid crystal display of claim 1 wherein said liquid crystal droplets have optic axes with random alignment in the absence of an electric field across said polymer matrix.

11. The color variance polymer liquid crystal display of claim 1 wherein said liquid crystal droplets have optic axes with at least partial alignment in the absence of electric field across said polymer matrix;

12. The color variance polymer liquid crystal display of claim 1 wherein said liquid crystal droplets have optic axes uniformly aligned in the absence of said electric field across said polymer matrix.

13. The color variance polymer liquid crystal display of claim 1 wherein the index of refraction of said polymer matrix is substantially close to all indexes of refraction of said liquid crystal droplets so as to produce two non-scattering states.

14. The color variance polymer liquid crystal display of claim 1 wherein the index of refraction of said polymer matrix and the indexes of refraction of said liquid crystal-droplets are such that said display produces a scattering state and a non-scattering state.

15. A color variance polymer matrix display comprising:

a polymer matrix;

droplets of liquid crystal material dispersed in said polymer matrix to produce two fully scattering states, said liquid crystals having optic axes uniformly aligned in one direction upon application of an electric field of sufficient magnitude to said polymer matrix;

a mixture of dyes incorporated in said liquid crystal droplets such that the polymer matrix exhibits color changes ranging between a first color and a second color in response to changes in the magnitude of the electric field matrix;

whereby said display will produce said first color in the absence of an electric field to said polymer matrix and said second color when an electric field of sufficient magnitude is applied to said polymer matrix; and whereby said display will produce shades of color between said first and second colors upon application of an electric field having a magnitude above zero and less than said sufficient magnitude to said polymer matrix.

16. The color variance polymer matrix display of claim 15 wherein said mixture of dyes comprises a positive order parameter dye and a negative order parameter dye.

17. The color variance polymer matrix display of claim 15 wherein said mixture of dyes comprises a positive order parameter dye and a zero order parameter dye.

18. The color variance polymer matrix display of claim 15 wherein said mixture of dyes comprises a negative order parameter dye and a zero order parameter dye.

19. The color variance polymer matrix display of claim 15 wherein said liquid crystal material is nematic.

20. The color variance polymer matrix display of claim 15 wherein said liquid crystal material exhibits positive dielectric anisotropy.

21. The color variance polymer matrix display of claim 15 wherein said liquid crystal material exhibits negative dielectric anisotropy.

22. The color variance polymer matrix display of claim 15 wherein said liquid crystal material exhibits positive dielectric anisotropy or selectively negative dielectric anisotropy depending upon the frequency of a voltage applied across said polymer matrix.

23. The color variance polymer matrix display of claim 15 wherein said polymer matrix is a resin, thermoplastic, epoxy or latex.

24. A color modulating device changes from a first color to a true colorless state, said device comprising:

a transparent superstrate;

a substrate spaced from said superstrate, a polymer matrix interposed between and in contract with said superstrate and substrate;

droplets of liquid crystal material dispersed in said polymer matrix, said liquid crystal material having optic axes uniformly aligned in one direction upon application of an electric field across said polymer matrix;

a mixture of dyes incorporated in said liquid crystal droplets such that the polymer matrix exhibits color changes ranging between a first color and a true colorless state in response to changes in magnitude of said electric field;

wherein each index of refraction of said liquid crystal droplets is greater or less than the index of refraction of said polymer matrix;

whereby said display will produce said first color in the absence of an electric field across said polymer matrix and will attain a true colorless state when an electric field of sufficient magnitude is applied across said polymer matrix; and whereby said display will produce said color in reduced levels of intensity upon application of an electric field having a magnitude above zero and less than the said sufficient magnitude across said polymer matrix.

25. The color modulating device of claim 24 wherein said mixture of dyes comprises a positive order parameter dye and a negative order parameter dye.

26. The color modulating device of claim 24 wherein said mixture of dyes comprises a positive order parameter dye and a zero order parameter dye.

27. The color modulating device of claim 24 wherein said mixture of dyes comprises a negative order parameter dye and a zero order parameter dye.

28. The color modulating device of claim 24 wherein said liquid crystal material is nematic.

29. The color modulating device of claim 24 wherein said liquid crystal material exhibits positive dielectric anisotropy.

30. The color modulating device of claim 24 wherein said liquid crystal material exhibits negative dielectric anisotropy.

31. The color modulating device of claim 24 wherein said liquid crystal material exhibits positive dielectric anisotropy or selectively negative dielectric anisotropy depending upon the frequency of a voltage applied across said electrodes.

32. The color modulating device of claim 24 wherein the index of refraction of said polymer matrix is substantially close to all indexes of refraction of said liquid crystal droplets so as to produce two non-scattering states.

33. The color modulating device of claim 24 wherein the index of refraction of said polymer matrix and the indexes of refraction of said liquid crystal droplets are such that said display produces a scattering state and a non-scattering state.

34. The color modulating device of claim 24 wherein said liquid crystal droplets have optic axes with random alignment in the absence of an electric field across said polymer matrix.

35. The color modulating device of claim 24 wherein said liquid crystal droplets have optic axes with at least partial alignment in the absence of an electric field across said polymer matrix.

36. The color modulating device of claim 24 wherein said liquid crystal droplets have optic axes uniformly aligned in the absence of said electric field across said polymer matrix.

* * * * *

UNITED STATES PATENT AND TRADEMARK OFFICE
CERTIFICATE OF CORRECTION

PATENT NO. : 5,499,121
DATED : March 12, 1996
INVENTOR(S) : Brewer

It is certified that error appears in the above-identified patent and that said Letters Patent is hereby corrected as shown below:

IN THE TITLE Change "$N_p$ <or> BOTH $N_E$ and $N^O$" to
--$N_p$ <or> BOTH $N_E$ and $N_0$--. Item [75],
Change "Vigo County, Ind." to --San Diego, California--.
Change "Tabin, Flannery" to --Tabin & Flannery--.
Claim 4, column 9, line 53, change "herein" to --wherein--.
Claim 11, column 10, line 10, change "of electric" to --of an electric--. Claim 14, column 10, line 23, after "crystal", delete the hyphen.

Signed and Sealed this

Seventeenth Day of September, 1996

Attest:

BRUCE LEHMAN

Attesting Officer

Commissioner of Patents and Trademarks